Nov. 17, 1936.  S. VORECH  2,061,120
STEERING MECHANISM
Filed March 5, 1935  2 Sheets-Sheet 1

Inventor
Stephen Vorech
By
Attorney

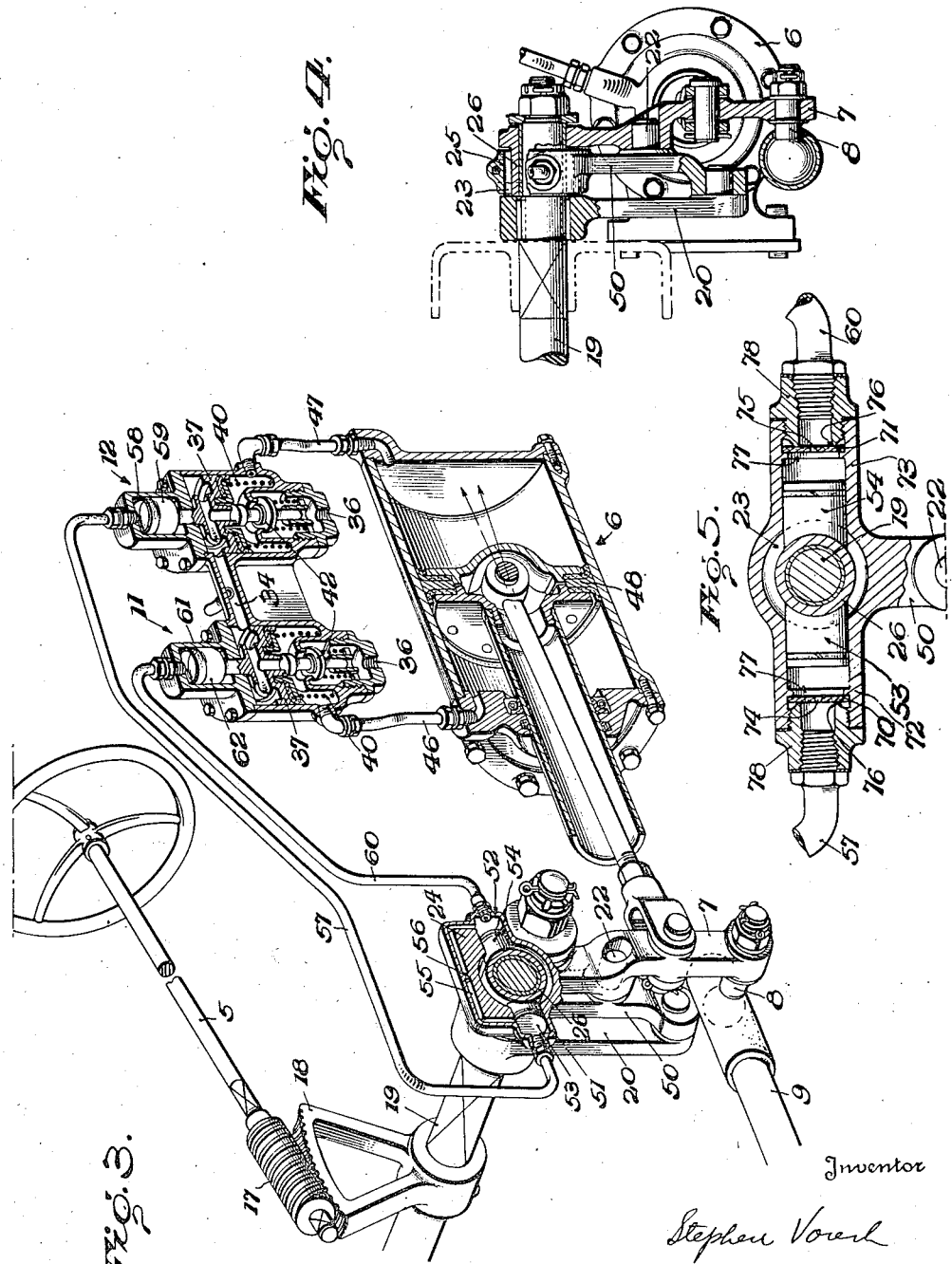

Patented Nov. 17, 1936

2,061,120

UNITED STATES PATENT OFFICE 2,061,120

STEERING MECHANISM

Stephen Vorech, Pittsburgh, Pa., assignor to Bendix-Westinghouse Automotive Air Brake Company, Pittsburgh, Pa., a corporation of Delaware Application March 5, 1935, Serial No. 9,468

8 Claims. (Cl. 180—79.2)

This invention relates to steering apparatus and more particularly to power-operated apparatus especially adapted for use with the steering mechanism of motor vehicles.

One of the objects of the present invention is to provide a novel, manually-controlled power steering mechanism for motor vehicles, normally operable to effect power steering of a vehicle under the control of an operator, but arranged so as to permit manual steering in the event of power failure.

Another object is to provide, in a mechanism of the above character, a novel construction including a shock absorber or damping device, so arranged with respect to the steering mechanism as to damp or absorb road shocks which might otherwise be transmitted to the mechanism to effect oscillation of the power unit thereof.

Still another object is to provide, in a steering mechanism of the type employing a fluid pressure motor, a novel, hydraulically-operated valve mechanism for controlling the application of fluid pressure to the motor, said mechanism being quickly and readily responsive to manually-applied controlling movements.

A further object is to provide, in a mechanism of the above character which includes a lever system for actuating the valve apparatus, a novel, combined hydraulic damping device and motor for such valve apparatus, the construction being such that oscillation tendencies due to road shocks will be effectively damped while enabling ready operation of the device through manually-applied force to efficiently operate said valve apparatus.

Additional objects and novel features of the invention will appear more fully hereinafter from the following detailed description when taken in connection with the accompanying drawings, wherein several embodiments of the invention are illustrated. It is to be expressly understood, however, that the drawings are employed for purposes of illustration only and are not designed as a definition of the limits of the invention, reference being had to the appended claims for this purpose.

In the drawings, wherein similar reference characters refer to like parts throughout the several views:

Fig. 3 is a perspective view, partly in section, of a slightly modified form of the power steering mechanism;

Fig. 4 is a side view, partly in section, of the lever arrangement shown in Fig. 3, and Fig. 5 is an end sectional view of a slightly modified form of the damping device of Fig. 3.

Figures 1, 2:
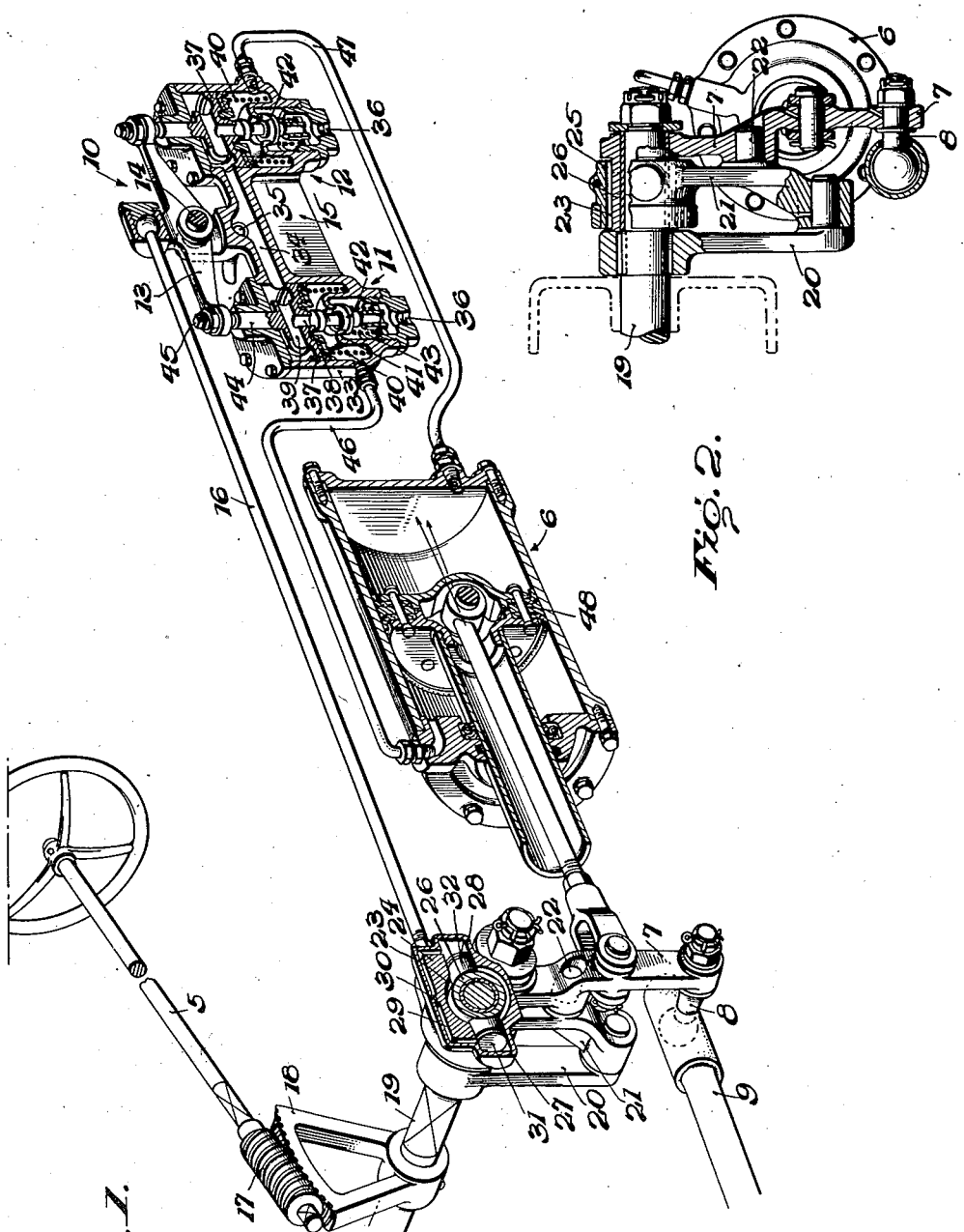
Fig. 1 is a perspective view, partly in section, of a motor vehicle power steering apparatus constructed in accordance with the present invention.
Fig. 2 is a side view, partly in section, of certain of the levers shown in Fig. 1.

Referring more particularly to Fig. 1, the present invention is illustrated therein as including a manually-operable steering column 5 adapted to control the flow of fluid power to a double-acting motor 6 which, upon operation in either direction, is adapted to effect oscillation of a power-operated pitman or steering arm 7 having a connection 8 to a drag link 9 of a conventional type of vehicle steering mechanism.

Means are provided for controlling the application of fluid to the motor 6, and as shown, such means are manually operated through rotation of the steering column 5 in either direction. As shown, the valve mechanism 10 comprising similar valve devices 11 and 12 is adapted to be selectively operated by a rocker arm 13 pivotally connected as by means of a pin 14 to a stationary casing 15, the rocker being suitably connected to an actuating rod 16 which is adapted to be reciprocated longitudinally in either direction. In order to effect such reciprocation of the valve control valve by the steering column 5, a worm 17 carried by the steering column meshes with a worm segment 18 suitably secured to a shaft 19, the latter being rotataby mounted in the vehicle frame. An arm 20, also secured to the shaft 19, is pivotally connected to the lower end of a valve-operating lever 21 which in turn is pivotally mounted as at 22 to the pitman arm 7. The upper end portion of the valve-operating lever 21 is so formed as to surround shaft 19, there being provided, however, a slight amount of play or lost motion 23 between the arm 21 and the shaft in order to effect reciprocation of the valve-operating rod 16 when the arm 21 is moved about its pivotal connection 22.

One of the features of the present invention resides in the provision of dashpot or damping means associated with the lever 21 in order to cushion or damp the oscillatory movement of said lever due to road shocks, for example, which would otherwise effect reciprocation of the valve control rod 16 and cause operation of the valve mechanism 10 when it is not desired to supply any fluid to the motor 6. To this end, the upper portion 24 of lever 21 is so formed as to provide a dashpot and includes an enlargement provided with a central opening 25 which surrounds the shaft 19 as heretofore stated with a certain degree of lost motion 23 therebetween, it being observed from Fig. 2 that an axially-extending hub portion 26 formed on the pitman arm 7 is rotatably mounted on the shaft 19 and is interposed between the latter and the wall of the opening 25. The end 24 is also so formed as to provide a pair of opposed cylinders 27 and 28 which are in communication through duct 29, there being disposed a restriction 30 in said duct in order to retard the flow of fluid from one cylinder to the other. Within each respective cylinder, pistons 31 and 32 are positioned which bear against the hub portion 26 and in the normal position of the parts as shown in Fig. 1 permit communication between the cylinders through the duct 29. It will be noted, however, that during oscillatory movement of the lever 22, the end 24 of said lever moves in one direction or another, such movement being damped by the passage of the fluid in one or the other direction through the restricted duct 29 in response to the relative movement between the cylinders and pistons, it being understood that the cylinders and the duct are normally completely filled with some suitable hydraulic fluid such as oil, for example.

Referring more particularly to the valves 11 and 12, each comprises a casing 33, one portion of which is adapted to communicate through an exhaust passage 34 with an atmospheric port 35, while another portion is adapted to communicate through an intake passage 36 with a suitable supply of fluid pressure. Slidably mounted in the valve casing is a reciprocating piston element 37 provided with an exhaust port 38 communicating with a transverse passage 39 connected with exhaust passage 34. The element 37 is resiliently urged upwardly as shown, by means of a spring 40, the same being confined between said element and a portion 41 of the casing 33. The portion 41 forms an inlet port which is normally closed by a combined inlet and exhaust valve 42 resiliently urged as by means of a spring 43 to the position shown where the space below the piston communicates with the atmosphere through port 38 and passage 34 and wherein such space is cut off from the intake passage 36. The piston 37 is provided with a stem 44 in constant engagement with an adjustable screw 45 carried by the rocker 13, the construction being such that each of the springs 40 of the valves 11 and 12 tends to center the rocker and thus maintain the above described valve parts in the position shown in Fig. 1.

From the above, it will be readily understood that upon operation of the valve 11, for example, to depress member 44, the piston 37 will be moved downwardly to contact valve 42, thus closing off the exhaust port 38 and opening intake 41 thereby permitting fluid under pressure to flow into the valve chamber beneath the piston and effecting a reaction in opposition to the force applied to operate the valve, the chamber beneath the piston being suitably associated through conduit 46 in the case of valve 11 and 47 in the case of valve 12 with opposite ends of the fluid motor 6. It will be readily apparent that the pressure of the fluid within the valve chamber beneath the piston elements will be the same as the fluid pressure required for steering under the various conditions of operation and that consequently the piston elements of the valves will offer a reaction to the operator through the connections between the valves and the steering column 5 in a degree proportional to the power required for steering.

With the above named construction, normal manual operation of the steering column in such a direction as to provide actuation of valve 11 for example, will effect a downward movement of the valve element 42 as heretofore set forth, thus establishing communication between the source of fluid pressure and the space beneath the piston 37. Fluid pressure then flows through conduit 46 to the left of the piston 48 of the motor 6 to move the said piston to the right as viewed in Fig. 1, the steering arm 7 being moved in a counterclockwise direction about shaft 19 and through the pivotal connection 22 tending to move the rod 16 to the right, thus lessening the force applied to valve 11 and permitting the latter to be moved to lapped position by the fluid pressure beneath the piston element 37. Movement of the steering column 5, on the other hand, in a direction to operate valve 12, will serve to supply fluid pressure to the right of piston 48 in the motor 6 to effect steering movement of the arm 7 in the opposite direction from that above described, and upon cessation of movement of the steering column, the motor 6 will tend to move the valve-operating lever 21 in such a direction as to enable valve 12 to move to lapped position.

As heretofore pointed out, one of the features of the present invention resides in the damping of shocks imparted to the steering mechanism due to oscillations of the dirigible wheels by reason of any looseness or other defectiveness in the vehicle steering apparatus or by reason of road shocks communicated thereto. For example, if an external shock is imparted to the steering arm 7 in such a direction as to tend to cause the same to be moved in a counterclockwise direction about the shaft 19, the valve rod 16 will tend to be moved to the right by the lever 21 to operate the control valve 12. By reason of the hydraulic damping device constituted by cylinders 27 and 28 together with pistons 31 and 32, however, valve-operating oscillatory movement of the lever 21 will be damped, and the road shock will be absorbed by the compression of the liquid in the said cylinders which, as heretofore stated, are restrictedly in communication through the duct 29. Thus road shocks or other oscillating tendencies of the steering mechanism will be effectively damped and power operation will only be had during manually-operated controlling movements of the steering column.

A slightly modified form of the invention is shown in Figs. 3 and 4, the difference between this form and the form heretofore described residing in the utilization of the hydraulic damping fluid for not only absorbing road shocks but also for operating the valve mechanism which supplies the power fluid to the power actuator. Referring more particularly to Fig. 3, the valve-controlling lever 50, similar to the corresponding lever 21 of Fig. 1, is provided with damping cylinders 51 and 52 having pistons 53 and 54 therein, the cylinders communicating through duct 55 having a restriction 56 interposed therein. Each of the cylinders, however, also communicates with valve mechanisms 11 and 12 by means of suitable conduits in order to convey the damping fluid within the cylinders to the valve devices for operation of the latter. As shown, the cylinder 51 is connected by a conduit 57 with a chamber 58 of valve 12, the latter containing a piston 59 secured directly to the pressure-responsive element 37. The cylinder 52 is connected by means of a conduit 60 with a chamber 61 having a piston 62 therein directly connected with the pressure-responsive element 37 of valve device 11. The remaining elements of the structure of the modification shown in Fig. 3 are similar to those utilized in connection with the form of the invention shown in Fig. 1.

In operation of the modified form of the invention, rotation of the steering column 5 in such a direction as to effect clockwise movement of the lever 20 will serve to move the valve-actuating lever 15 in a clockwise direction about the pivotal connection 22 between said lever and the pitman arm 7. The upper portion 24 of the lever 50, during such movement, will serve to decrease the volume of the cylinder 51 and the fluid will be initially by-passed to the cylinder 52 through the duct 55. As soon as the piston 53 covers the duct 55 leading into the cylinder 51, however, the remaining fluid will pass through the conduit 57 into chamber 58 of valve device 12 in order to cause downward movement of the piston 59 and consequent operation of the valve 12, thus serving to admit fluid pressure to the motor 6 at the right of the piston 48. Upon movement of the latter to the left, as viewed in Fig. 3, the steering mechanism of the vehicle will be moved in the proper direction through the drag link 9 and at the same time the valve-operating lever 50 will be moved in a counterclockwise direction about its lower end, acting as a pivot, in order to permit centering of the upper end 24 of the valve-operating lever 50 and thus permit a lapping of the valve device. Movement of the steering column 5 in the opposite direction will, in a similar manner, open valve 11 to admit fluid pressure to the opposite side of the piston 48 and thus cause steering of the vehicle in the other direction. From the above construction, it will be readily perceived that road shocks transmitted through the drag link 9 to the valve-operating mechanism will be absorbed by the fluid in the dashpot arrangement in a manner similar to that shown in Fig. 1. According to the sizes of the various ducts and the by-pass 55, it is also contemplated that the hydraulic damping device in this form of the invention will actuate the valves 11 or 12 in a different phase relation with respect to the oscillating steering system. Thus with such non-synchronous operation of the valves in response to road shocks, the reciprocations of the motor 6, a highly undesirable condition, would be quickly arrested or damped.

In Fig. 5, a slightly modified form of the damping device of Fig. 3 is illustrated and which omits the hydraulic by-pass. In this form of the invention, oscillating tendencies of the valve-controlling lever 50, due to road shocks (for example, are damped through the use of choke devices 70 and 71 positioned within cylinders 72 and 73 respectively and provided with openings 74 and 75. Each choke is normally held against a seat 77 by means of a fitting 78, threadedly received by the cylinders and provided with an end portion 76 engaging the choke. As in the case of Fig. 3, the cylinders 72 and 73 as well as conduits 57 and 60 are filled with a suitable hydraulic fluid.

In the operation of this form of the invention, the chokes will not impede to any great extent the flow of fluid through conduits 57 or 60 in response to usual steering movement, which is relatively slow, as compared to movement of the lever 50 in accordance with road shocks. However, in the event of a road shock which tends to cause a rapid movement of the lever 50 with respect to the pistons 53 and 54, such movement will be rapidly damped by reason of the liquid trapped between the chokes and the pistons and the small openings 74 and 75 through which the liquid must pass. Thus this form of the invention, while omitting the by-pass of the other modifications, yet retains the desirable feature of hydraulic damping as well as that of fluid operation of the control valves.

It will be observed that in all forms of the invention, in the event of power failure, manual operation of the vehicle steering mechanism may be had as soon as the lost motion 23 has been taken up between the upper end 24 of the valve-controlling levers and the hub 26 of the pitman arm 7. This construction also enables combined manual and power operation so that the device is capable of operation either solely as a power steering mechanism, a manually-operated steering device with power assistance, or as a simple, manually-controlled steering arrangement.

There is thus provided by the present invention a novel steering mechanism so constituted as to be readily operable in a manner similar to manually-controlled steering mechanisms now in use. The provision of the fluid shock absorber or damping device in connection with the steering arrangement disclosed enables ready and efficient absorption of road shocks or other oscillations caused by the vehicle steering apparatus to the end that undesired operation of the power unit is avoided. The construction is such, however, that the shock absorber feature does not hinder in any way the proper operation of the power device, and in two of the forms of the invention, the hydraulic damping fluid has been utilized for operating the valves controlling the flow of fluid to the power motor.

While several embodiments of the invention have been illustrated and described herein, it is to be understood that the invention is not limited thereto but is capable of a variety of mechanical expressions as will now be apparent to those skilled in the art. Reference will, therefore, be had to the appended claims for a definition of the limits of the invention.

What is claimed is:

1. In a power-operated steering mechanism for vehicles having a manually-operated oscillatable steering shaft, a steering arm journalled on said shaft, a fluid motor operatively connected with said arm, valve means for controlling the flow of fluid to and from said motor, and means including a lever for operating said valve means, said lever having an operative connection at one end with said shaft, and a lost motion connection at its other end with said shaft, the lost motion connection including a hydraulic damping device for preventing sudden and abrupt operation of said valve means.

2. In a power-operated steering mechanism for vehicles having an oscillatable steering arm, a fluid motor operatively connected with said arm, valve means for establishing a flow of fluid to and from said motor, and means including an oscillatable manually-controlled lever for operating said valve means, said lever having a hydraulic damping device associated with one end thereof, said device having a pair of chambers in restricted communication together with pistons therein disposed on either side of said steering arm and abutting the latter.

3. In a steering mechanism for motor vehicles having a power-operated steering arm, a fluid motor operatively connected with said arm, fluid-operated valve means for controlling the admission of fluid pressure to said motor, and means including a manually-operable lever pivotally connected with said arm for controlling the flow of motive fluid to said valve means to render the latter operative, one end of said lever being formed as a dashpot for preventing sudden and abrupt operation of said valve means.

4. In a steering mechanism for motor vehicles having a power-operated steering arm, a fluid motor operatively connected with said arm, hydraulically-operated reactive valve means for controlling the admission of fluid pressure to said motor, said valve means including a pressure-responsive element subjected to the pressure of the fluid conducted to said motor, a manually-operable lever pivotally connected with said arm, a hydraulic device carried by said lever for dampening abrupt relative movement between the latter and arm, and means for connecting said device and valve means whereby the latter is hydraulically operated when the lever is moved relatively to said arm, the motive fluid acting upon said pressure-responsive element in opposition to the pressure of the fluid conducted to said motor.

5. In a power steering mechanism for motor vehicles, a manually-operable shaft, a steering arm, a fluid motor operatively connected with said arm, means including a pair of pivotally-connected members for connecting said shaft and arm, means for limiting the extent of pivotal movement of one of said members relative to the other, fluid-operated valve means for controlling the flow of fluid to said motor, and a combined hydraulic damping and motion-transmitting device carried by one of said members and communicating with said fluid-operated power means.

6. In a steering mechanism for motor vehicles having a steering arm, a fluid motor operatively connected with said arm, fluid-operated valve means for controlling the admission of fluid pressure to said motor, said valve means including a fluid-receiving chamber, an oscillatable manually-controlled lever pivotally connected with said arm and having a limited amount of relative pivotal movement with respect thereto, a fluid pressure damping device for damping said relative pivotal movement, said device including a reservoir of fluid, means connecting said reservoir and said chamber, and means for increasing the pressure of the fluid in said reservoir during said relative pivotal movement to operate said valve means.

7. In a steering mechanism for motor vehicles having a steering arm, a fluid motor operatively connected with said arm, hydraulically-operated valve means for controlling the admission of fluid pressure to said motor, a member pivotally connected with said arm and having a limited relative movement in opposite directions with respect thereto, a hydraulic device having a pair of chambers containing liquid connected with said valve means, means for developing pressure in the liquid in one or the other of said chambers in response to said relative movement in opposite directions, and means for restrictively connecting said chambers whereby said device functions as a dashpot during said relative movement.

8. In a steering mechanism for vehicles having a steering arm, a motor operatively connected with said arm, hydraulically-operated means for controlling said motor, a manually-operable controlling member associated with the arm, a hydraulic dashpot movable with said member, and means for conducting liquid from said dashpot to said first named means.

STEPHEN VORECH.